Feb. 2, 1926.

R. M. LOVEJOY

UNIVERSAL COUPLING

Filed Oct. 28, 1921  4 Sheets-Sheet 1

Inventor—
Ralph M. Lovejoy.
By— Heard Smith & Tennant
Attorneys.

Feb. 2, 1926. 1,571,595
R. M. LOVEJOY
UNIVERSAL COUPLING
Filed Oct. 28, 1921  4 Sheets-Sheet 2

Inventor—
Ralph M. Lovejoy.
By— Heard Smith & Tennant
Attorneys.

Feb. 2, 1926.

R. M. LOVEJOY 1,571,595

UNIVERSAL COUPLING

Filed Oct. 28, 1921 4 Sheets-Sheet 3

Fig. 5.

Inventor—
Ralph M. Lovejoy.
By— Heard Smith & Tennant,
Attorneys.

Feb. 2, 1926.

R. M. LOVEJOY 1,571,595

UNIVERSAL COUPLING

Filed Oct. 28, 1921

Inventor—
Ralph M. Lovejoy.
By—Heard Smith & Tennant.
Attorneys.

Patented Feb. 2, 1926.

1,571,595

UNITED STATES PATENT OFFICE.

RALPH M. LOVEJOY, OF MEREDITH, NEW HAMPSHIRE.

UNIVERSAL COUPLING.

Application filed October 28, 1921. Serial No. 510,994.

*To all whom it may concern:*

Be it known that I, RALPH M. LOVEJOY, a citizen of the United States, and resident of Meredith, county of Belknap, State of New Hampshire, have invented an Improvement in Universal Couplings, of which the following description, in connection with the accompanying drawing, is a specification, like characters on the drawing representing like parts.

This invention relates to improvements in universal couplings for connecting a driving member to a driven member and one of the objects of the invention is to provide a novel coupling which can be readily assembled and dismantled.

Another object of the invention is to provide a novel means for lubricating the bearings of the trunnions of a coupling instrumentality in the yokes of a universal coupling.

More particularly the invention contemplates the provision of means for maintaining a supply of lubricant and transmitting said lubricant to the trunnion bearings and for preventing the escape of the lubricant from the trunnion bearings whereby the necessity of encasing the universal joint is avoided.

A further object of the invention is to provide a universal joint construction comprising yoke members which are interchangeable and adapted to be assembled in pairs upon the trunnions of a coupling instrumentality and thereafter secured to the driving and driven members respectively.

A further feature of the invention consists in providing interengaging means upon said sectional yoke members and on the heads by which they are secured to the driving and driven members respectively which will aid in retaining the sectional yoke members in assembled position and thereby produce a more rigid coupling structure.

A further object of the invention is to provide an extensible universal coupling which will permit a limited relatively longitudinal movement of the shafts which are connected by the couplings. This is accomplished in the preferred embodiment of the invention illustrated herein by pivotally connecting suitable members to the yoke members of the coupling and connecting said members together by means of a pivot, the axis of which is located at a distance from the axes of said yoke members, the yoke members of this type of universal joint preferably being formed in interchangeable sections adapted to be assembled upon the trunnions of a suitable coupling instrumentality and provided with suitable means for lubricating the trunnion bearings as above described.

These and other objects and features of the invention will more fully appear from the following description and the accompanying drawings and will be pointed out in the claims.

An illustrative embodiment of the invention is illustrated in the accompanying drawings as connecting a driving shaft to a power transmission shaft such as are usually employed in automobiles and like constructions. It will, however, be understood that the universal coupling disclosed herein is adapted to be used to transmit power from any type of rotary driving member to a rotary driven member.

The present invention is illustrated herein both as applied to a usual type of universal joint comprising yoke members connected to the driving and driven members respectively, the yokes being connected to trunnions upon a coupling block in the form of a Greek cross, and also as applied to a preferred type of extensible universal coupling. The application of the invention to the usual type of universal coupling is illustrated in Figs. 1 to 4 in which a driving shaft 1 is provided with a tapered end portion upon which is mounted a head 2 having an annular flange 3 presenting a flat face 4 the inner edge of which is provided with a preferably cylindrical countersink 5. The head 2 is clamped upon the shaft by a nut 6.

Figure 1:
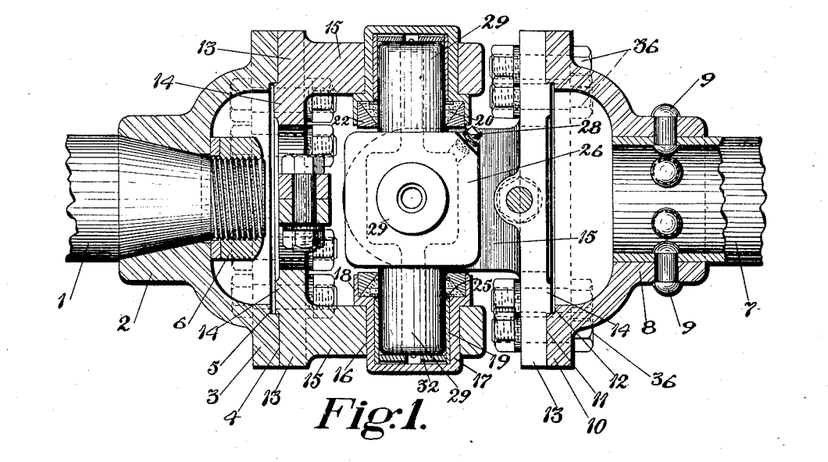
Fig. 1 is a vertical longitudinal sectional view through a universal coupling embodying my invention, a portion of the driving shaft, the coupling means and trunnions being shown in elevation.

The driven member may be similarly constructed, but as shown herein comprises a tubular shaft 7 having a head 8 secured upon its end by rivets 9, said head being provided with a flange 10 presenting a flat face 11 having at its inner edge a cylindrical countersink 12 corresponding in diameter to the countersink 5 of the head of the driving shaft.

Figure 2:
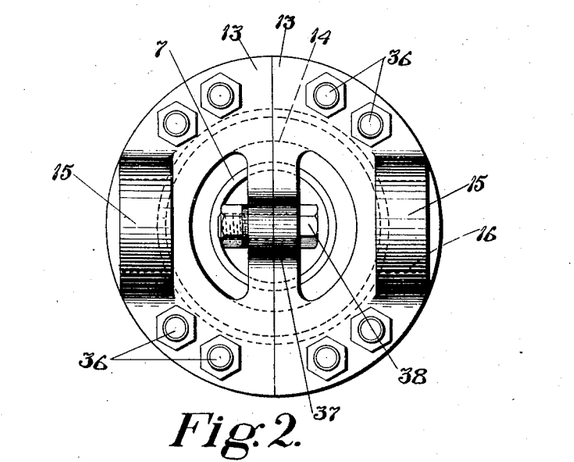
Fig. 2 is an elevation of a pair of sectional yoke members, forming a part of the universal coupling, in assembled position.

The yoke members of the universal joint are connected to the heads of the driving shaft and driven shaft respectively and are constructed in separable sections which are interchangeable so that the description of one of said sections will serve as a description for all, it being understood that the sections are assembled in pairs upon the heads of the driving and driven members respectively.

Each of the separable sections consists of a semi-cylindrical base portion 13 having a face complementary to the face 4 of the head upon the driving member, or the face 11 upon the head of the driven member, and is provided with an extension 14 adapted to fit within the countersink 5 of the head of the driving member or the countersink 12 of the head of the driven member.

Figure 4:
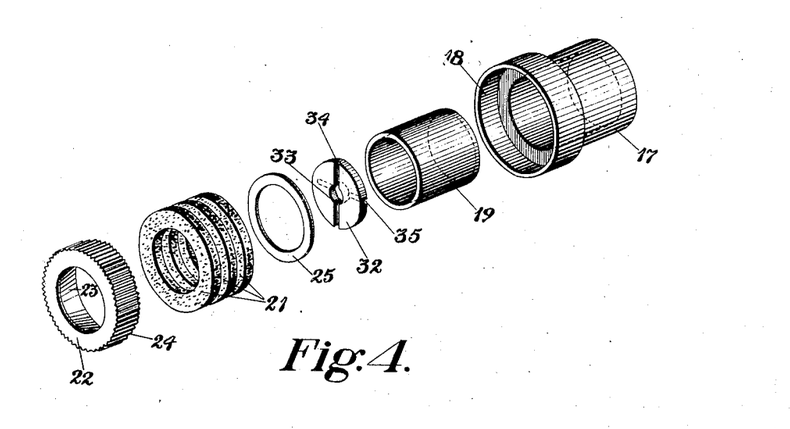
Fig. 4 is a perspective view of the various parts which, when assembled, form the journal bearing for one of the trunnions of the universal coupling.

Each yoke section is provided with an integral arm 15 having a socket to receive and form a bearing for the trunnion of a coupling means which, as is customary in universal joints, is in the general form of a Greek cross. Each pair of assembled yoke sections consequently presents sockets having their open ends or mouths in axial alinement. The sockets for the trunnions may be formed directly in the yoke arms, but preferably are formed by thimbles fixedly secured within suitable apertures in the arms. As illustrated herein each of the arms of the yoke sections is provided with an aperture 16 in which a thimble 17 having a closed base is forced, preferably by hydraulic pressure. The thimble 17 is provided at its outer end with a flange 18 producing a relatively large mouth forming a stuffing box.

Desirably each of the thimbles is provided with a rotatable bushing 19 of bronze, or other suitable material, extending preferably from the base of the socket to the shoulder formed by the outer flanged portion or mouth. The stuffing box formed by the flange 18 of the thimble is provided with a suitable packing 20, preferably of fibrous material and desirably consisting of a plurality, such as three or more washers 21 of cork composition. This packing—the cork composition washers—is compressed and retained in place by a retaining ring 22 having a beveled inner face 23 adapted to engage the packing, and a knurled periphery 24 adapted when forced into the stuffing box firmly to engage the flange 18 forming its wall. A washer 25 desirably is interposed between the packing and the bushing to prevent the fibrous material from being pressed into the bearing or forced between the wall of the bushing and the wall of the socket. By placing a suitable mandrel within the bushing of the socket the bearing may thus be assembled before being applied to the trunnion.

Figure 3:
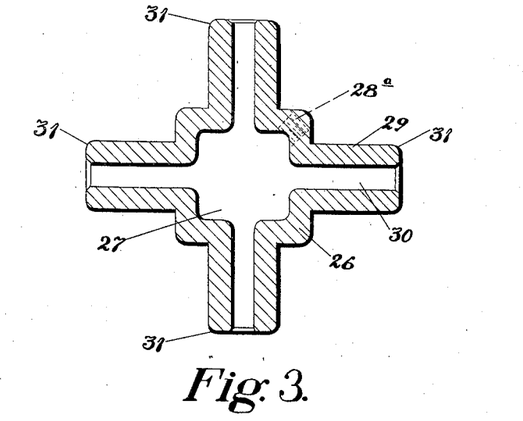
Fig. 3 is a detail sectional view of one form of coupling block in a plane passing through the axes of the trunnions of the coupling block.

The coupling block comprises a body 26, preferably of substantially rectangular form, having a central chamber 27 adapted to form a lubricant reservoir. A suitable port 28ᵃ desirably is provided in the wall of the central chamber to permit the reservoir to be filled, said port being closed by a screw threaded plug 28. Tubular trunnions 29 integral with the body extend at right angles to each other from said body and the passages 30 of the tubular trunnions communicate with the lubricant reservoir 27. The lubricant within the chamber will consequently be projected outwardly through the passages 30 by centrifugal force when the coupling is rotated, to lubricate the trunnion bearings, as will hereinafter more fully appear. The ends of the trunnions desirably are provided with rounded edges 31 so that when the bearings, formed by the sockets in the yokes, are assembled upon the trunnions the fibrous packing will not be sheared off and carried into the bearing.

A thrust member, preferably in the form of a disk 32, of hardened steel, having a central opening 33 and radial grooves or ducts 34 and 35 upon its opposite faces, desirably is interposed between the end of each of the tubular trunnions and the base of the socket in which the trunnion is seated. This thrust member or disk desirably is of slightly less diameter than the diameter of the bushing so that it is freely rotatable within the base portion of the socket. The central aperture communicates with the apertures in the tubular trunnion and the radial ducts or grooves assist in conveying the lubricant which is forced through the tubular trunnion and thrust member to the periphery of the bearing.

It will thus be noted that the thimble which forms the socket for each of the yoke arms may be assembled upon the arm, the bushing and thrust member placed in it, and the packing and retaining ring, with the washer which is interposed between the packing and the bushing, may be assembled and then applied to the trunnion of the coupling means. When pairs of the sections are thus assembled they may be secured to the heads by suitable bolts 36 which, as illustrated in Fig. 2, desirably are in pairs located in the periphery of the section and serve to secure the same to the flanges 3 and 10 of the driving and driven members respectively.

In order to enable the coupling unit to be assembled before being attached to the heads of the driving and driven members each of the yoke sections desirably is provided with a boss 37 having an aperture to receive a bolt 38 so that the juxtaposed bosses of a pair of sections may be firmly bolted together after the sections are assembled upon their respective trunnions. Such an assembled unit may be kept in storage ready for application to the heads of the rotatable driven and driving members when the same are to be fully assembled. Obviously this universal coupling unit may be secured to other driving and driven members as well as the heads of shafts such as are illustrated herein. Furthermore, the assembling of pairs of sections in this manner enables the sections to be drawn together before they are applied to the heads 3 and 10, so that the cylindrical sections will readily fit into the countersinks in said heads.

Figure 5:
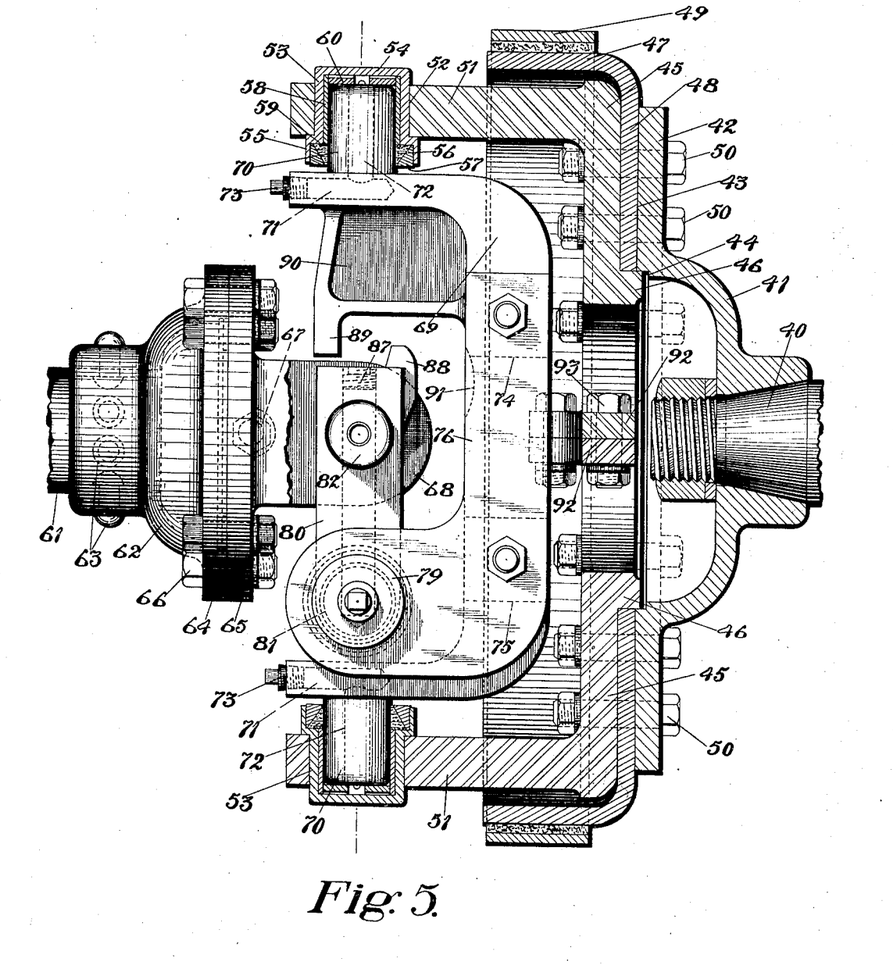
Fig. 5 is a view, partially in vertical section, of an extensible universal joint embodying the preferred form of my invention.
Figure 6:
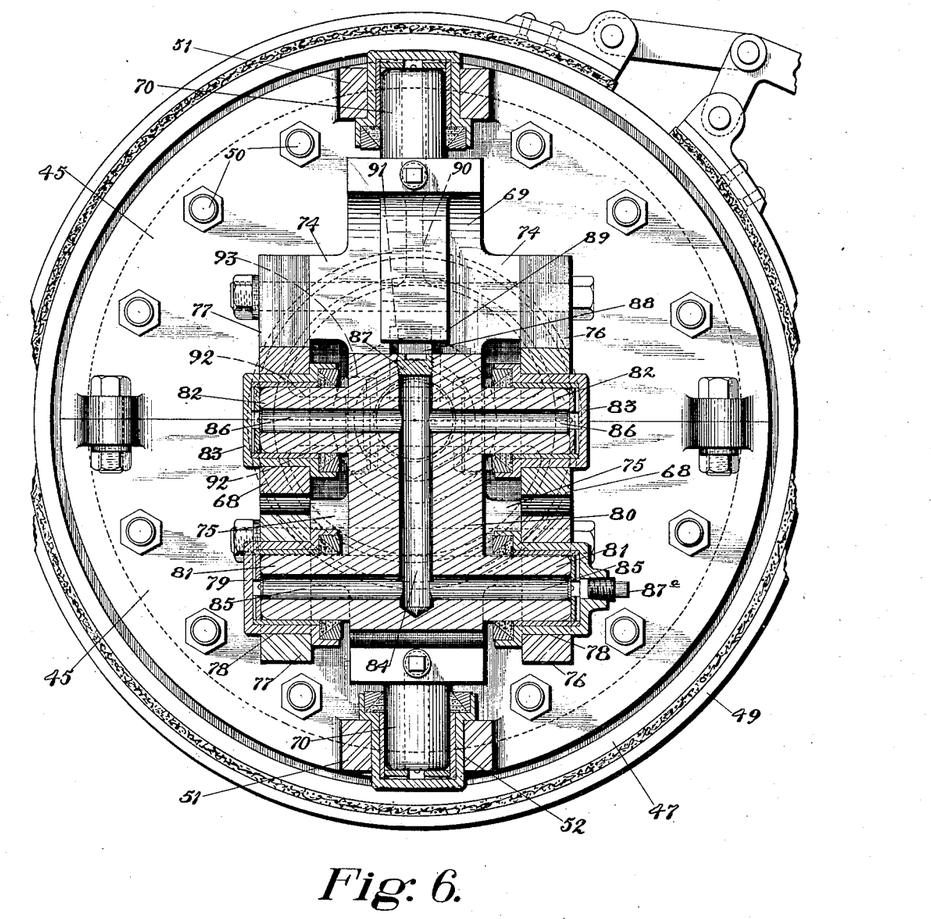
Fig. 6 is a vertical transverse sectional view of the same, the coupling block, its trunnions and bearings, and the yoke arms in which one of the coupling members is trunnioned being shown in section and the remainder of the mechanism in elevation.

In Figs. 5 and 6 a preferred type of extensible universal coupling is illustrated which embodies the features of the invention heretofore described, and also includes means for permitting a relatively longitudinal movement of the driving and driven members during the rotation thereof. Such a construction is particularly desirable for use in automobile driving shafts since there is a considerable amount of vertical vibration and certain longitudinal movements between the engine and the rear driving axle, particularly when the machine is being operated upon a rough road. Furthermore, the extensibility of the driving and driven shafts is desirable in many instances in order to avoid the necessity of accuracy in assembling.

In the preferred construction illustrated in Figs. 5 and 6 a universal coupling is provided which embodies the essential features of the universal coupling of the ordinary type heretofore described; that is to say, the driving and driven shafts are provided with suitable heads. The yokes are preferably formed of interchangeable sections and the coupling member or members desirably are provided with means for supplying a lubricant to the trunnions by the action of centrifugal force and for preventing the escape of the lubricant from the sockets in which the trunnions are journalled.

In respect to the extensible universal coupling the present application is in part a division and continuation of my prior application No. 443,000, filed February 7, 1921. The particular embodiment of the invention disclosed herein, however, also includes the various features of the universal coupling heretofore described.

In the construction illustrated in Figs. 5 and 6 one of the rotatable members, such as the driving member 40, has secured to it a head 41 provided with an annular flange 42 having a flat face 43 provided with an annular countersink 44. The yoke of the coupling which is secured to this head comprises interchangeable members 45 preferably semi-cylindrical in form and having semi-cylindrical extensions 46 adapted to extend into the countersink 44. In the construction illustrated a brake drum 47 is provided having an annular flange 48 which may be clamped between the yoke sections 45 and the flanges 42 upon the head. A suitable brake 49 is diagrammatically illustrated in operative relation to the brake drum. The yoke sections and brake are secured to the flange 42 of the head by suitable bolts 50, preferably arranged in groups of three or more. Each of the yoke sections is provided with an arm or boss 51 having an aperture 52 in which is seated a thimble 53, of the character above described, having a closed base 54 and an enlarged mouth 55 adapted to contain a suitable packing 56, preferably a plurality of rings formed of cork composition or other fibrous material, which is compressed and held in said mouth by a retainer 57 of the character above described. Each of the thimbles desirably is provided with a rotatable bushing 58 and a washer 59 is interposed between the end of the bushing and the fibrous packing to prevent the latter from being forced into the bearing of the thimble when the parts are assembled. A washer 60, having a central aperture and laterally extending grooves adjacent the base of the thimble, desirably is provided in order to permit proper distribution of the lubricant within the bearing as above described. The other rotatable member, such as the driven member 61, as illustrated herein, is tubular in form and is provided with a head 62 which is secured to it by rivets 63. The head 62 has a laterally extending flange 64 to which interchangeable yoke members 65, similar in all respects to the yoke members 13 of the construction illustrated in Figs. 1 and 2, are secured by bolts 66, the sectional yoke members being secured to each other by a bolt 67, corresponding to the bolt 38 in the previously described construction. These yoke members also are provided with extensions or arms 68 which are similar in all respects to the yoke members 15 of the previous construction and desirably are likewise provided with thimbles to receive the ends of the trunnions of the coupling members.

In the extensible universal coupling illustrated the arms 51 and 68 of the yoke members, which are connected to the respective rotatable shafts, are connected together by a plurality of coupling members which are respectively pivotally connected to the yokes and are connected together by pivotal means, the axis of which is located at a distance from the longitudinal axes of the driving and driven members, thus enabling a relatively longitudinal movement of said members during the rotation of the driving and driven members.

In the preferred construction illustrated herein a gate 69 is connected to the arms 51 of the sectional yoke members by trunnions 70 which extend into the bearings formed by the thimbles 53. Desirably oil wells 71 extend from the ends of suitable portions of the gate member inwardly, transversely of the axes of the trunnions, and communicate with suitable ducts or conduits 72 leading preferably axially through the trunnions. The oil wells 71 may be closed in any suitable manner as by screw threaded plugs 73.

The gate desirably is provided on each side with laterally extending bosses 74 and 75 to which are secured plates 76 and 77 which are provided with apertures 78 in which thimbles 79 are seated, the thimbles preferably being in all respects similar to the thimbles 53 above described, and adapted to receive trunnions of the coupling block. If desirable, however, the arms may be provided with other types of sockets to receive the trunnions of the coupling block.

In the preferred construction illustrated herein a coupling block is provided having parallel pairs of trunnions adapted respectively to engage the sockets in the plates of the gate and the sockets in the arms 68 of the yoke member for the shaft which is referred to herein as the driven shaft. This coupling block preferably is a metallic block of forged steel, or other suitable material, having a body 80 and a lower pair of trunnions 81 seated in the sockets or thimbles 79 of the plate member, and a pair of trunnions 82 in parallelism with the trunnions 81 seated in thimbles 83 of the arms 68 of the yoke members 65.

The coupling block desirably is provided with a longitudinally extending oil chamber 84 and ducts or conduits 85 and 86 extend longitudinally through the trunnions 81 and 82 respectively into communication with said central oil chamber. The open end of the oil chamber may be closed by a suitable plug 87.

In the present construction the position of the open end of the oil chamber is such as to be inconvenient for the purpose of filling the oil chamber. In order, therefore, to introduce oil into the reservoir one of the tubular thimbles 79 is provided with a boss having an aperture therein to permit the introduction of lubricant, and a screw threaded plug 87$^a$ seated in said aperture serves to close this oil port.

It will be obvious that the oil which is introduced into the central oil chamber 84 will be thrown outwardly by centrifugal force through the ducts 86 in the trunnions into the sockets in which the trunnions are journalled, so that these bearings will always be kept in a proper state of lubrication. The loss of lubricant from the bearings is prevented by the stuffing boxes in the mouths of the thimbles as above described.

The relative longitudinal movement of the driving and driven members of the coupling is limited in one direction by the engagement of the ends of the arms 68 of the yoke 65 with the plates 76 and 77 of the gate member. The movement in the other direction desirably is limited by an extension 88 on the coupling block 80 which is adapted to engage a lug 89 projecting from the web 90 of the gate 69.

In the present construction a recess 91 is provided in the gate to prevent engagement of the extension 88 with the body portion of the gate.

In the preferred construction illustrated herein the yoke members 45 are provided with a skeletonized central portion having, however, transverse webs 92 which are adapted to be connected together by bolts 93 to aid in assembling the coupling before it is secured to the heads of the driving and driven shafts.

In assembling the extensible universal coupling illustrated in Figs. 5 and 6 the sockets of the yoke members 45 are placed upon the trunnions 70 and the complementary sectional yoke members 45 secured together by the bolts 93. The yoke members then are clamped upon the flanges 42 of the head 41 by the bolts 50 with the cylindrical extension 46 extending into the countersink 44. Where a brake drum is employed its flange 48 is interposed between the sectional yoke members and the flange 42. The lower trunnions 81 of the coupling block are assembled in the plates 76 and 77 and the latter are secured to the gate by suitable bolts extending through the bosses 74 and 75. The trunnions 82 are inserted in the sockets or thimbles in the arms 68 of the interchangeable sectional yoke members 65 and the latter secured together and to the other driven shaft in the manner above described. Obviously the coupling unit may be assembled independently of its attachment to the driving and driven members so that such coupling members can be readily stored until needed.

While the preferred extensible type of universal coupling and the usual type of universal coupling embodying the improvements disclosed herein are adapted for general use both forms of coupling desirably may be very conveniently employed in connection with the driving mechanism for automobiles, the extensible universal coupling preferably being employed to connect the driving shaft which is actuated by the engine to a suitable transmission shaft and a universal coupling of the type illustrated in Figs. 1 to 3 employed in connecting the transmission shaft to the stud shaft which actuates the differential driving mechanism for the rear axles of the automobile.

It will be understood that the embodiments of the invention disclosed herein are of an illustrative character and not restrictive, and that various changes in form, construction and arrangement of parts may be made within the spirit and scope of the following claims.

It will also be understood that the following claims are intended to cover any type of extensible universal coupling for a rotatable driving and a rotatable driven member which are connected by coupling means adapted to permit relative longitudinal movement of said members.

Having thus described my invention, what I claim as new, and desire to secure by Letters Patent, is:

1. A universal coupling for a driving and a driven shaft comprising coupling means having trunnions, yoke members formed in complementary sections adapted to be assembled in pairs, each section having a socket provided with a closed base to receive a trunnion, means for securing the sections of a pair together after assemblage upon the trunnions of the coupling member and means for securing the assembled pairs of sections respectively to said driving and driven shafts.

2. A universal coupling comprising coupling means having a lubricant chamber and provided with pairs of axial alined trunnions having ducts leading from said chamber through the trunnions, yoke members formed in complementary sections adapted to be assembled in pairs, each section having a socket with a closed base and provided with a rotatable bushing to receive a trunnion, means for securing the sections of a pair together after assemblage upon the trunnions of said coupling means and means for securing the assembled pairs of sections respectively to the driving and driven shafts.

3. A universal coupling comprising coupling means having a lubricant chamber and provided with pairs of axial alined trunnions having ducts leading from said chamber through the trunnions, yoke members formed in complementary sections adapted to be assembled in pairs, each section having a socket with a closed base to receive a trunnion, a rotatable thrust member intermediate of the end of the trunnion and base of the socket, means for securing the sections of a pair together after assemblage upon the trunnions of said coupling member and means for securing the assembled pairs of sections respectively to the driving and driven shafts.

4. A universal coupling comprising coupling means having a lubricant chamber and provided with pairs of axial alined trunnions having ducts leading from said chamber through the trunnions, yoke members formed in complementary sections adapted to be assembled in pairs, each section having a socket with a closed base and provided with a rotatable bushing to receive a trunnion, a rotatable disk having lubricant ducts located intermediate of the end of the trunnion and the base of the socket, means for securing the sections of a pair together after assemblage upon the trunnions of said coupling member and means for securing the assembled pairs of sections respectively to the driving and driven shafts.

5. A universal coupling for a driving and a driven member comprising complementary sectional yoke members adapted to be assembled in pairs having oppositely disposed trunnion sockets provided with closed bases, means for connecting pairs of said yoke members respectively to the driving and driven members, coupling means having trunnions journalled in said sockets, means for supplying a lubricant to said sockets through said trunnions and stuffing boxes at the mouths of said sockets having a packing consisting of a resilient fibrous material to prevent the escape of the lubricant from said sockets and retaining means fixedly secured in the sockets acting to compress the fibrous material and to force the same toward the trunnions.

6. A universal coupling for a driving and a driven member comprising complementary sectional yoke members adapted to be assembled in pairs having oppositely disposed trunnion sockets provided with closed bases, means for connecting pairs of said yoke members respectively to the driving and driven members, coupling means having trunnions journalled in said sockets, means for supplying a lubricant to said sockets through said trunnions, stuffing boxes at the mouths of said sockets having a packing consisting of a plurality of rings formed of cork composition and retaining means rigidly secured in the socket acting to compress said packing and to force the same toward the trunnions.

7. A universal coupling for a driving and a driven member comprising complementary sectional yoke members adapted to be assembled in pairs having oppositely disposed trunnion sockets provided with closed bases, means for connecting pairs of said yoke members respectively to the driving and driven members, coupling means having trunnions journalled in said sockets, means for supplying a lubricant to said sockets through said trunnions, freely rotatable bushings in said sockets and stuffing boxes at the mouths of said sockets having a packing consisting of a resilient material, retaining means for compressing said packing and a metallic washer intermediate of said packing and bushing.

8. A universal coupling for a driving and a driven member comprising complementary sectional yoke members adapted to be assembled in pairs, provided with oppositely disposed apertures having integral walls, thimbles fixedly secured in said walls presenting trunnion sockets having closed bases and enlarged mouth portions, means for securing said pairs of yoke members respectively to said driving and driven members, coupling means having trunnions journalled in said sockets, means for supplying a lubricant to said sockets, a resilient packing in the mouth portions of said thimbles and a packing retainer forcibly seated in said mouth portion having a beveled face acting to compress said packing and to force the same toward the trunnion.

9. A universal coupling for a driving and a driven member comprising complementary sectional yoke members adapted to be assembled in pairs, provided with oppositely disposed apertures having integral walls, thimbles fixedly secured in said walls presenting trunnion sockets having closed bases and enlarged mouth portions, means for securing said pairs of yoke members respectively to said driving and driven members, coupling means having tubular trunnions journalled in said sockets, and provided with a central chamber communicating with the passages in said tubular trunnions, rotatable thrust members provided with ducts for the lubricant intermediate of the ends of said trunnions and the bases of said sockets and means for preventing the escape of lubricant from the mouths of said sockets.

10. A universal coupling for a driving and a driven member comprising coupling means having trunnions, yoke members formed in complementary sections adapted to be assembled in pairs, each section having an integral arm provided with a socket to receive a trunnion, means for securing the sections of a pair together after assemblage upon their trunnions and means for securing the assembled pairs of sections respectively to said driving and driven members.

11. A universal coupling for a driving and a driven member, each having a head, comprising coupling means having trunnions, yoke members formed in complementary sections adapted to be assembled in pairs, each section having an integral arm provided with a socket to receive a trunnion, means for securing the sections of a pair together after assemblage upon their trunnions, means for securing the assembled pairs of sections respectively to said heads and interengaging means upon said heads and yoke member sections operable when said sections are assembled upon said heads to prevent relative movement therebetween.

12. A universal coupling for a driving and a driven member, comprising flanged heads secured to each of said members and provided with cylindrical countersinks, sectional yoke members adapted to be assembled in pairs having bases provided with extensions to fit within said countersinks, and having arms provided with trunnion-receiving sockets, coupling means having trunnions journalled in said sockets, means for clamping together the members of each pair of yoke sections when assembled upon said trunnions and means for securing the assembled pairs of sections to said heads with the extensions of said sections engaging the walls of said countersinks.

13. A universal coupling for a rotatable driving and a driven member comprising a yoke pivotally connected to one of said members, a gate pivotally mounted in said yoke upon an axis normal to the axes of said rotatable members, a coupling block pivotally mounted upon said gate upon an axis normal to the pivotal axis of said gate and at a distance from the axes of said rotatable members and means pivotally connecting said coupling block to the other rotatable member upon an axis parallel to the axis upon which the coupling member is pivotally connected to said gate.

14. A universal coupling for a rotatable driving and a driven member comprising a yoke pivotally connected to one of said rotatable members, a coupling block pivotally mounted in said yoke, means pivotally connecting said block to the other rotatable member and a detent carried by said yoke positioned to limit the pivotal movement of said coupling block.

15. An extensible universal coupling for a rotatable driving and a driven member comprising complementary sectional yoke members adapted to be assembled in pairs, having oppositely disposed trunnion sockets, means connecting said assembled pairs respectively to the driving and driven members, a plurality of coupling members having trunnions pivotally mounted in the respective pairs of yoke members and means pivotally connecting said coupling members upon an axis located at a distance from the axes of said driving and driven members.

16. An extensible universal coupling for a rotatable driving and a driven member comprising complementary sectional yoke members adapted to be assembled in pairs having oppositely disposed trunnion sockets provided with closed bases, means connecting said pairs respectively to said driving and driven members, a plurality of coupling members having trunnions pivotally mounted respectively in the pairs of yoke members to swing about axes normal to each other, means pivotally connecting said coupling members upon an axis located at a distance from the axes of said driving and driven members, means for supplying a lubricant to said sockets through said trunnions and means for preventing the escape of the lubricant from said sockets.

17. A universal coupling for a rotatable driving and a driven member comprising complementary sectional yoke members adapted to be assembled in pairs, having oppositely disposed trunnion sockets, means connecting said pairs respectively to the driving and driven members, a gate having trunnions pivotally mounted in one of said pairs of sockets and having trunnion sockets located at a distance from the axes of said driving and driven members and a coupling block having trunnions mounted respectively in the sockets of said gate and in the sockets of the other pair of yoke members.

18. A universal coupling for a rotatable driving and a driven member comprising complementary sectional yoke members adapted to be assembled in pairs, having oppositely disposed trunnion sockets, means connecting said pairs respectively to the driving and driven members, a gate having trunnions pivotally mounted in one of said pairs of sockets and having trunnion sockets located at a distance from the axes of said driving and driven members and a coupling block provided with a lubricant chamber and having trunnions mounted respectively in the sockets of said gate and in the sockets of the other pair of yoke members and means for transmitting lubricant from said lubricant chamber to said sockets by centrifugal force caused by the rotation of said coupling block.

19. A universal coupling for a rotatable driving and a driven member comprising complementary sectional yoke members adapted to be assembled in pairs, having oppositely disposed trunnion sockets, means connecting said pairs respectively to the driving and driven members, a gate having trunnions pivotally mounted in one of said pairs of sockets and having trunnion sockets located at a distance from the axes of said driving and driven members, a coupling block provided with parallel pairs of trunnions mounted respectively in the sockets of said gate and in the sockets of the other pair of yoke members, a lubricant chamber in said block, conduits extending from said lubricant chamber through said trunnions to deliver lubricant to said trunnion sockets and means for preventing the escape of lubricant from the respective sockets.

20. A trunnion shaft for universal couplings comprising a thimble having a closed base and an enlarged mouth portion, a bushing rotatably mounted in said thimble, a washer seated upon the base of the mouth portion of said thimble rotatably fitting upon the trunnion shaft, a fibrous packing in the mouth of said thimble and a packing retainer forcibly seated in the mouth portion of said thimble acting to compress said packing against said washer and to force said packing toward the trunnion shaft.

In testimony whereof, I have signed my name to this specification.

RALPH M. LOVEJOY.